March 19, 1974   A. COSTA   3,798,094

METHOD OF SECURING A CLOSURE MEMBER TO A PLASTIC CONTAINER

Filed Jan. 27, 1972

United States Patent Office 3,798,094
Patented Mar. 19, 1974

3,798,094
**METHOD OF SECURING A CLOSURE MEMBER
TO A PLASTIC CONTAINER**
Allan Costa, 622 Udall Road,
West Islip, N.Y. 11795
Continuation-in-part of abandoned application Ser. No.
827,944, May 26, 1969. This application Jan. 27, 1972,
Ser. No. 221,211
Int. Cl. B29c 27/04
U.S. Cl. 156—69                        5 Claims

ABSTRACT OF THE DISCLOSURE

The present invention relates to a method of air and liquid tight welding or fusing a closure member to a small cylindrical plastic container, particularly a thin-walled container as widely used for cosmetic and pharmaceutical flowable compounds. The invention further relates to a container produced in accordance with the method of the invention.

This application is a continuation-in-part application based on my copending application Ser. No. 827,944 filed May 26, 1969, now abandoned.

BACKGROUND

Small plastic containers of the general kind above referred to must usually be closable when not in use. Such closure is generally effected by screwing or sliding a closure cap upon a closure member secured to the container and constituting in effect part thereof. While the closure member and the container can be manufactured in one piece, such manufacture is often not sufficiently economical. Containers of the kind herein referred to are mass-produced low-cost items so that the cost factor is a very important one. Various attempts have been made to produce the closure member and the body of the container as separate parts and then to effect a permanent air and liquid tight bond between the two parts.

According to my prior Pat. 3,583,458, issued June 8, 1971, a closure member in the form of a hollow plug made of a thermoplastic material is fitted into the open end of a cylindrical container also made of a thermoplastic material and a solid metal ring or sleeve is sandwiched between the plug and the juxtaposed wall of the container. This sleeve is then rapidly heated by excitation of a surrounding induction coil to a temperature at which the sleeve causes melting of the surface layers of the adjacent walls thereby forming a strong bond between the sleeve and the adjacent walls. This mode of joining the container and the plug therefor has several valuable advantages in that welding or fusing is reliably and rapidly effected, but it still has some shortcomings. The plastic material effecting the bond between the container wall and the sleeve is drawn from the wall material of the container and this tends to cause an undesirable weakening of the container wall, especially if this wall is very thin and hence delicate—as it is frequently the case with containers of the kind here involved. Moreover, the metal sleeve to be heated tends to be fairly thick as it is mass-produced and thus has a comparatively high heat-storing capacity. Obviously, this stored heat must be dissipated and such dissipation has to be primarily through the container wall which may cause distortions and discolorations of the container. Such distortions and discolorations are not commercially acceptable.

THE INVENTION

It is a broad object of the invention to provide a novel and improved method of welding or fusing a closure member to a thin-walled cylindrical container by induction-generated heat which avoids the aforepointed out disadvantages.

A more specific object of the invention is to provide a novel and improved method of securing the closure member to the container without any damage to the outer surface of the container if even the wall of the container is very thin or delicate.

Another more specific object of the invention is to provide a novel and improved method of securing the closure member to the container in which the wall of the container and particularly the outside thereof is effectively protected against damage as may be caused by the generated welding or fusing heat by temporarily creating a heat barrier between the outer surface of the container and the sleeve as source of the heat.

Still another object of the invention is to provide a novel and improved method of effectively welding or fusing the closure member to the container with a minimum of heat thereby further reducing the danger of a deformation of the container and a deterioration of the outer container surface.

A further more specific object of the invention is to provide a novel and improved method of welding or fusing a closure member to a thin-walled cylindrical plastic container which substantially increases the bonded together areas and thus the strength of the bond.

It is also an object of the invention to provide a novel and improved assemblage for carrying out the method of the invention, which substantially reduces the amount of heat that must be dissipated and also increases the welded or fused areas thereby achieving the aforepointed out advantages of the method according to the invention.

Another more specific object of the invention is to provide a novel and improved assemblage in which the flowable material required to effect the bond between the container and the closure member is supplied by layers on the sleeve inserted between the container wall and the closure member rather than from the container wall itself.

SUMMARY OF THE INVENTION

The aforepointed out objects, features and advantages and other objects, features and advantages which will be pointed out hereinafter, are obtained by placing between the inner wall surface of a thin-walled container made of a thermoplastic material and a closure member inserted into the container and also made of a thermoplastic material, a sleeve made of metal foil such as steel foil and coated on both sides with a layer of a heat meltable non-metallic material such as a thermoplastic material or a suitable lacquer. This sleeve is rapidly induction heated by excitation of a surrounding induction coil to a temperature such that the material of the layers becomes flowable. Rehardening of the melted material upon cooling, effects a strong and permanent bond between the inner container wall and the sleeve on one hand, and the outer wall of the closure member and sleeve on the other hand without drawing any material from the container wall. The sleeve may have in its wall a multitude of perforations. The heat-storing capacity of such perforated sleeve is obviously substantially reduced, that is, considerably less heat must be dissipated than if the sleeve would be solid thereby correspondingly reducing the danger of distortion and weakening of the container wall. Moreover, the melted material will penetrate more or less into the perforations in the sleeve thereby increasing the bonded areas and thus the strength of the bond.

To protect the container wall which as previously stated, is presumed to be very thin and hence, delicate, still further and particularly the outside of this wall which may be ornamented, the invention further provides directing a stream of a low temperature gaseous coolant upon the outside of the container wall adjacent to the sleeve therein, that is, upon the portion of the container wall which is most strongly affected by the afore referred to rapid heating of the sleeve to a high temperature. The gaseous coolant, which is preferably a deeply cooled fluid such as liquefied carbon dioxide, cools the respective portion of the container wall especially the outside thereof practically instantaneously to a temperature so low that it acts as a heat absorber and temperature reducer of the travelling heat wave which progresses from the welding focus (inside) towards the outer layers of plastic of the container's wall. Thus, by dilution in the cold gas jet, the welding or fusing calories are prevented from distorting the container. This process requires only a fraction of a second; however for certain ultra-delicate hues and patterns of plastic it can be useful to repeat this injection of cold gas on several following stations of the welding or fusing turntable, in order to eliminate all possibility of any amount of residual heat belatedly filtering through from the welding or fusing sleeve or ring towards the surface of the container. The jet stream of liquid carbon dioxide or other suitable coolant is applied to the container wall immediately upon cessation of the heating of the sleeve. The coolant is preferably applied one-quarter of a second after the induction current used for heating the sleeve is cut off.

Control of the energizing current used for heating of the sleeve and of the flow of the coolant can be conveniently effected by a timing and control system. Automatically operating timing and control systems suitable for the purpose are well known in the art and readily available in the market.

DETAILED DESCRIPTION OF THE INVENTION

In the accompanying drawing, preferred embodiments of the invention are shown by way of illustration and not by way of limitation.

Figure 1:
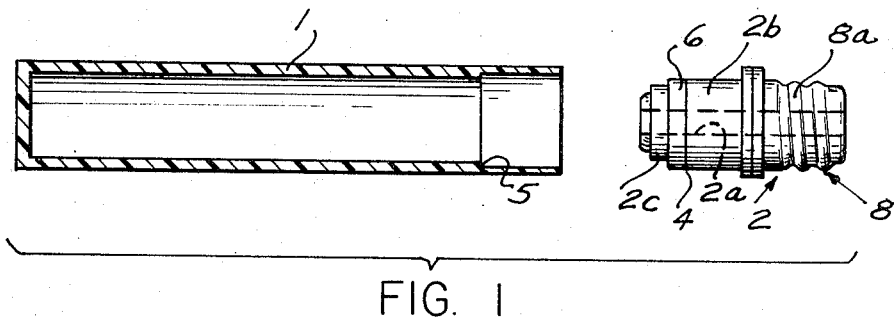
FIG. 1 is a longitudinal view, partly in section, of a small thin-walled container made of a thermoplastic material and a view of a closure member ready to be secured to the container, the container and the closure member being shown separated from each other.
Figure 2:
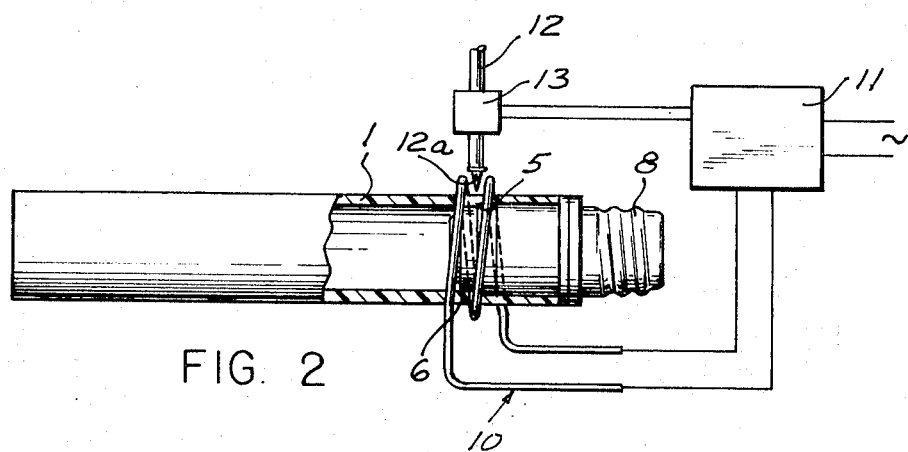
FIG. 2 is a longitudinal view similar to FIG. 1 but with the closure member inserted into the container and further showing a circuit system for temporarily heating the metal foil sleeve to effect fusing of the closure member to the container and cooling means for protecting the container wall from the heat generated by the heating of the sleeve.

Referring now to the figures more in detail, the embodiment of the invention as exemplified in FIGS. 1 and 2 comprises a cylindrical container 1. This container should be visualized as being a very small container such as are widely used for cosmetic, pharmaceutical and other flowable materials and as having a very thin, that is, physically rather than delicate wall made of a suitable thermoplastic material. In practice, the wall of such containers may be very thin, that is, it may have a thickness of only a few thousandths of an inch. Various plastic materials of suitable kind are well known and readily available in the market; suitable plastics are for instance, polyethylene, polypropylene or styrene.

The container is permanently closed at one end by an end wall and the other end of the container is to be closeable by a detachable closure cap (not shown). For this purpose a closure member 2, also made of thermoplastic material must be liquid and airtight secured to the container. This closure member has a set-off portion 2b which terminates in a further set-off extension 2c. The outer diameter of portion 2b is such that it fits snugly into the open end of container 1 as it is shown in FIG. 2 and portion 2c has an outer diameter so that a narrow annular gap is left between portion 2c and the inner container wall for a purpose which will be more fully explained hereinafter. The other end 8 of the closure member serves to receive the closure cap (not shown). This cap may be a screw cap in which case member 8 is threaded, as it is indicated at 8a, or the cap may be simply slipped upon portion 8. A lengthwise bore 2a through the closure member provides access into the interior of the container.

As it is shown in FIG. 1 a sleeve 6 is fitted upon extension 2c of the closure member with one edge of the sleeve abutting against a shoulder 4 defined by member portion 2b.

Sleeve 6 consists of an inner metal sleeve 15 preferably a steel sleeve sandwiched between two layers 16 and 17 made of a heat-meltable non-metallic material. The dimensions of metal sleeve 15 and the layers thereon are shown very much enlarged for clarification of illustration. The inner diameter of sleeve 6 is selected so that it just fits upon closure member portion 2c and the outer diameter so that it just fits into the open end of the container as will be more fully explained hereinafter.

The thickness of the wall of the metal sleeve 15 should be as thin as conveniently possible; a wall thickness between one thousandth and a few thousandths of an inch is desirable. In practice, sleeve 15 is made of foil. The material of the layers serves as fusing or welding flux for bonding the sleeve to the container and to the closure member as will also be more fully explained hereinafter. Generally speaking, the thickness of the layers should be selected so that they are capable of supplying welding or fusing flux sufficient for the purpose and require a minimum of heat and time to become liquid. There are known and readily available various thermoplastic materials which have a low melting point and are economically practical; as mentioned before, polyethylene, polypropylene or styrene are suitable. It has further been found that various lacquers readily available in the market, are suitable for the purpose; it is only essential that the lacquer does not carbonize if exposed to moderate heat such as 500° F. but becomes readily flowable at such or lower temperatures. Lacquers suitable for the purpose are available, for instance, under the name Ronci.

Figure 3:
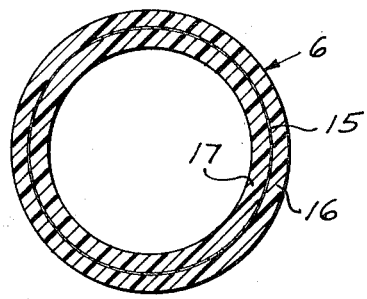
FIG. 3 is a cross-section of the sleeve on an enlarged scale.
Figure 4:
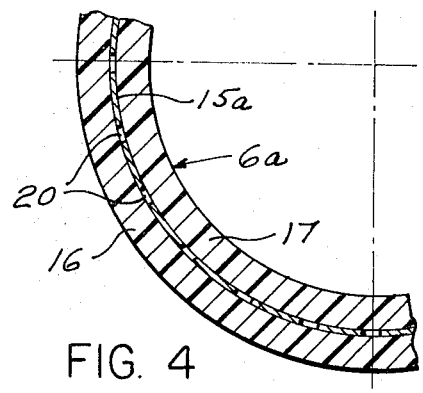
FIG. 4 is a fragmentary cross-section of a modification of the sleeve.

In the embodiment of FIG. 3, foil 15 has a solid wall but as is shown in FIG. 4 sleeve 6a includes a foil sleeve 15a which has in its wall a multitude of perforations 20. The advantages of such perforated foil sleeve will be more fully explained hereinafter.

To assemble closure member 2 on container 1, the closure member is inserted with its portions 2b and 2c into the open end of the container. As it is shown in FIG. 2, the other edge of sleeve 6 then abuts against a shoulder 5 provided on the inner wall of container 1 thereby correctly locating the closure member in the container.

For fusing or welding the closure member to the container and more specifically, sleeve 6 to closure member extension 2c and to the inner container wall, foil sleeve 15 is rapidly and temporarily heated to a temperature at which the material of layers 16 and 17 becomes flowable thereby automatically bonding itself to sleeve 15 and the surrounding walls of the closure member and the container. The heat necessary for this purpose is generated by a circuit system including an induction transformer 10. Coil windings of the transformer are wound about the container in juxtaposition to sleeve 6 therein. As it is evident, the coil windings and the metal sleeve 15 thus constitute the primary and the secondary of the transformer.

As has been previously pointed out, it is a principal object of the invention to prevent deformation and/or discoloration of the container wall which is presumed to be very thin and hence, delicate and which also may have on its outer surface decorations or information as to the contents of the container. For this purpose, it has been found advantageous to direct a jet stream of a coolant upon the outer surface of the container wall portion adjacent to the location of foil sleeve 15, that is, adjacent to the focal point of the heat. The coolant preferably has a very low temperature; a jet of liquid carbon dioxide has been found advantageous. There is diagrammatically shown in FIG. 2 a pipe 12 which should be visualized as being connected to a source of liquid carbon dioxide or another suitable coolant and terminates in a nozzle 12a pointing at the focal point of the generated heat. A suitable and conventional electromagnetically or electronically controlled valve indicated at 13 serves to open and close the flow of the coolant through pipe 12. The coil windings and valve 13 are connected to a diagrammatically shown conventional timing and control unit 11 which upon operation closes an energizing circuit for the coil windings for a predetermined period of time selected to effect heating of foil sleeve 15 to the required temperature and immediately upon termination of the heating operation temporarily opens valve 13 to admit the flow of the coolant to the container wall.

It has been found that radio frequency current (about 500,000 cycles per second; voltage about 2500 volts and amperage 320 to 400 milliamps) is particularly suitable for energizing the primary of the transformer (coil windings). It has further been found that foil sleeve 15 can be heated if needed in about ⅕ of a second to a temperature of about 1,000° F. Generally, a total heating period of somewhere between 3 and 10 milliseconds is sufficient to effect fusing or welding. The coolant should be applied within ⅕ of a second to one second after termination of the application of current to the coil windings; about ¼ of a second has been found to be suitable.

Extensive tests and theory show that the induction heating system as used according to the invention, especially if coupled with forced cooling, results in the physical phenomenon of thermal inertia or retarded heat transmission. The index or coefficient of the heat conductivity of the layer material and of the container wall is very low as compared with the heat conductivity of the metal of sleeve 15. This thermal inertia causes a violent and abrupt heating of sleeve 15 accompanied by a virtually instant flow of the molecules in the plastic material, yet efficiently intercepts, arrests and abducts the surging heat wave while the same is still travelling and before it reaches the outer surface of the container wall thereby preventing damage to the same.

The aforedescribed action of thermal inertia on the travelling heat wave is further increased by the powerful thermal-dynamic action obtained from the adiabatic expansion (900 to 15 p.s.i.) of the jet stream of liquid carbon dioxide. The explosive cooling effect by the impingement of the coolant upon the outside of the container wall is capable of creating (if desired) a temperature differential between the inside and the outside of the container wall which may be close to 1,000° F. thereby completely preventing any outside deformation or discoloration of the container surface.

Tests have shown that a container wall which is paper thin, may be distorted by a very minor excess of applied heat or a few milliseconds of excess heating time. Accordingly, it is highly desirable to reduce the heat and time requirements to a minimum. The provision of perforations 20 in the metal sleeve as shown in FIG. 4, serves this purpose. Obviously, the perforations reduce the total metal mass of sleeve 15 hence less time is required to heat up the sleeve and less heat must be dissipated than if the sleeve were solid. Moreover, the layer material when liquefied, will penetrate more or less into the perforations thereby increasing the fused areas and thus the strength of the bond between sleeve 15 and the surrounding walls.

As it is evident from the previous description, the method and the apparatus according to the invention, protect the container wall to the optimal possible extent. The produced bond is highly reliable, can be economically applied and any weakening of the container wall is avoided since the fusing material is supplied by the layers on the sleeve rather than taken from the inner wall of the container.

While the invention has been described in detail with respect to certain now preferred examples and embodiments of the invention, it will be understood by those skilled in the art, after understanding the invention, that various changes and modifications may be made without departing from the spirit and scope of the invention, and it is intended therefore, to cover all such changes and modifications in the appended claims.

What is claimed is:

1. A method of air and liquid tight securing a closure member within an open end of a small thin-walled container, said method comprising the steps of:
   providing a cylindrical small thin-walled container open at one end and made of a thermoplastic material and a closure member having a generally cylindrical end portion fittable into and said open container end and also made of a thermoplastic material;
   further providing a sleeve made of metal foil and coated on both sides with a layer of a non-metallic material melting above a predetermined elevated temperature;
   fitting said sleeve upon said end portion and inserting the same with the sleeve thereon into the open container end with the outside layer on the sleeve abutting against the inner wall of the container end;
   surrounding said container end by a coil including windings juxtaposed to said sleeve, said coil windings and the sleeve constituting the primary and the secondary of an induction transformer;
   energizing said coil with pulses of a radio current of medium high frequency for a period of time selected to heat said sleeve to a temperature at which the coating layers thereon are liquefied, the material of the layers upon rehardening fusing the sleeve to the adjacent walls of the container end and the end portion of the closure member, respectively; and
   directing instantaneously upon termination of said period of time against the outer surface of the container wall portion substantially jutaxposed to the position of the sleeve in the container a jet stream of a gaseous coolant, said coolant generating a thermal barrier impeding the tranmission of the heat of and from the sleeve to the outer surface of said container wall portion thereby protecting the same against deformation and discoloration by heat.

2. The method according to claim 1 wherein said radio current is applied to the coil windings for a period of about ⅕ of a second.

3. The method according to claim 1 wherein the thickness of said metal foil sleeve is between one to ten thousandths of an inch.

4. The method according to claim 1 wherein said jet stream of coolant is a stream of liquid carbon dioxide.

5. The method according to claim 4 wherein said coolant is applied to the respective container wall portion within about one-fifth second to one second after termination of the energization of the coil.

References Cited

UNITED STATES PATENTS

| | | | |
|---|---|---|---|
| 2,620,939 | 12/1952 | Weisgerber | 156—69 X |
| 3,367,808 | 2/1968 | Edwards | 156—272 X |
| 3,368,930 | 2/1968 | Beason | 156—498 X |
| 3,567,546 | 3/1971 | Morris et al. | 156—275 |
| 3,700,513 | 10/1972 | Haberhauer et al. | 156—272 X |
| 3,706,176 | 12/1972 | Leatherman | 156—272 X |

EDWARD G. WHITBY, Primary Examiner

U.S. Cl. X.R.

156—272, 275, 380, 448; 206—46